United States Patent
Rademacher

Patent Number: 5,808,579
Date of Patent: Sep. 15, 1998

[54] RADAR SYSTEM USING A CELL AVERAGING CONSTANT FALSE ALARM RATE DEVICE

[75] Inventor: Paul E. Rademacher, Setauket, N.Y.

[73] Assignee: Northrop Grumman Corporation, Los Angeles, Calif.

[21] Appl. No.: 772,668

[22] Filed: Dec. 20, 1996

[51] Int. Cl.⁶ .................. G01S 7/292; G01S 7/34
[52] U.S. Cl. .................. 342/93; 342/159; 342/162; 342/95
[58] Field of Search .................. 342/93, 95, 159, 342/160, 162, 203

[56] References Cited

U.S. PATENT DOCUMENTS

| | | | |
|---|---|---|---|
| 3,995,270 | 11/1976 | Perry et al. | 342/93 |
| 4,242,682 | 12/1980 | Musha et al. | 342/93 |
| 4,318,101 | 3/1982 | Musha et al. | 342/93 |
| 4,513,286 | 4/1985 | Irabu | 342/93 |
| 4,586,043 | 4/1986 | Wolf | 342/93 |
| 4,956,792 | 9/1990 | Sekine | 364/517 |
| 5,337,055 | 8/1994 | Ghignoni | 342/93 |
| 5,499,030 | 3/1996 | Wicks et al. | 342/93 |

*Primary Examiner*—John B. Sotomayor
*Attorney, Agent, or Firm*—Walter G. Sutcliff

[57] ABSTRACT

A cell averaging (CA) constant false alarm rate (CFAR) device for use in a radar system which filters noise and clutter from a signal containing a plurality of range cells. A moving window average calculator (MWAC) calculates a moving window average (MWA) for each range cell in a signal. A central processing unit (CPU) estimates a skew factor of a probability density function (PDF) and calculates an offset factor based on information contained in the signal. A multiplying device multiplies the offset factor by the MWA calculated for each range cell and creates a second signal containing a plurality of range cells. A comparator compares each range cell of the second signal to each corresponding range cell of the original signal, selects a the larger value of the two signals, and creates a third signal which is essentially free of noise and clutter.

9 Claims, 6 Drawing Sheets

FIG.3
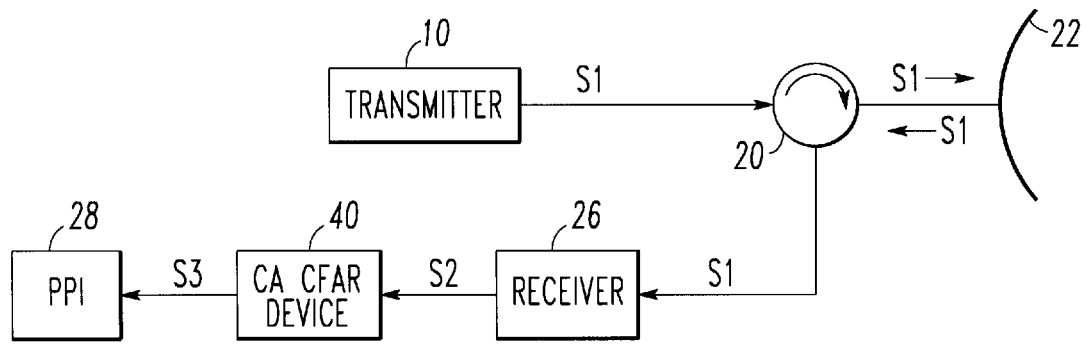
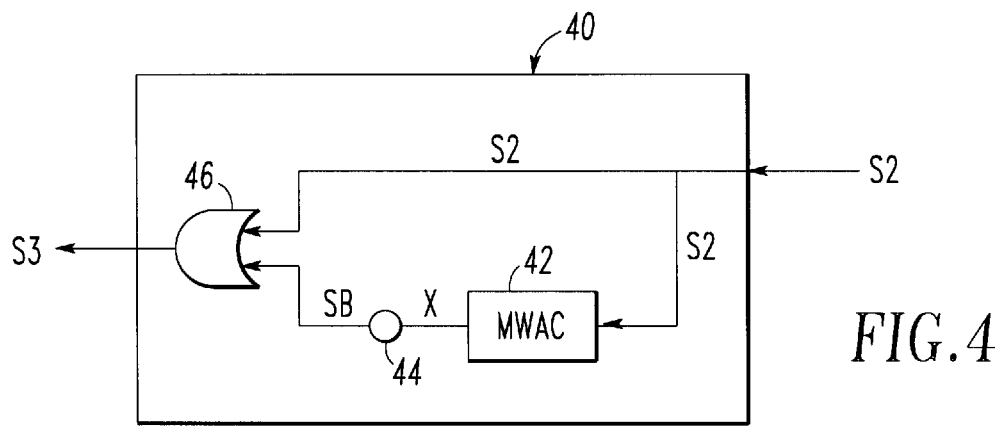
FIG.4
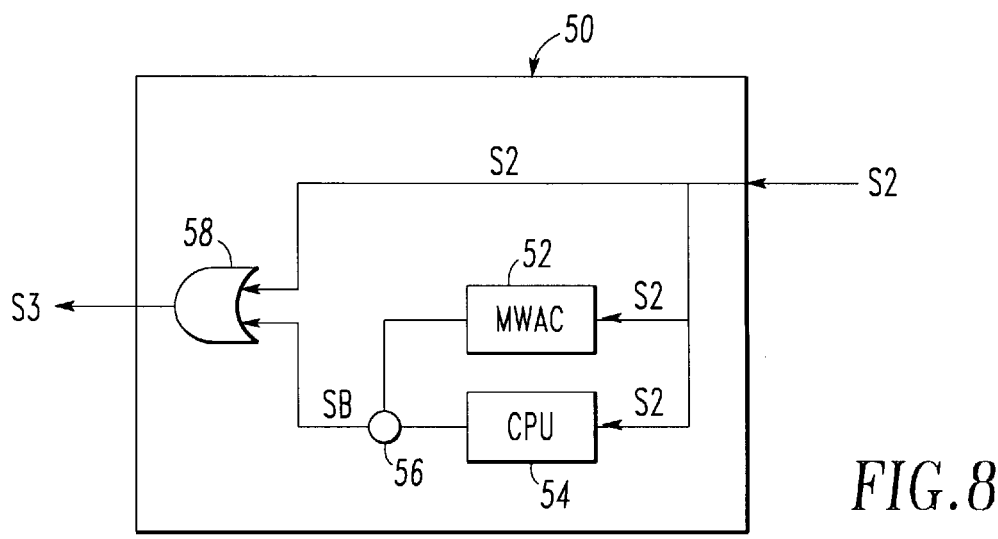
FIG.8

$$\text{MWA FOR R5} = \frac{(R1+R2+R3+R4+R5+R6+R7+R8+R9)}{9}$$

RADAR SYSTEM USING A CELL AVERAGING CONSTANT FALSE ALARM RATE DEVICE

FIELD OF THE INVENTION

The present invention relates to a radar system using a cell averaging (CA) constant false alarm rate (CFAR) device and more particularly to a radar system using a CA CFAR device which estimates a skew factor of a probability density function and calculates an offset factor based on information received by the radar system.

BACKGROUND OF THE INVENTION

FIG. 1, for example, shows a conventional radar system in which an object 24, such as a plane, can be identified. Referring to FIG. 1, a transmitter 10 produces a signal S1. The signal S1 includes a sequence of pulses 12, 14, 16 and 18. Each pulse 12–18 is separated by a pulse repetition interval (PRI) which is defined by range cells R1–R10.

The signal S1 produced by the transmitter 10 is forwarded to a duplexer 20 which routes the signal S1 to an antenna 22. The antenna 22 transmits the signal S1, including the batch of pulses 12–18, to identify the presence of the object 24. When the signal S1 contacts the object 24, it is reflected, returned to the antenna 22, and forwarded through the duplexer 20 to a receiver 26. The receiver 26, upon receipt of the reflected signal S1, converts the signal S1 to a lower frequency, samples the converted signal at each range cell R1–R10, and digitizes each sample to develop a signal S2.

The signal S2, which is shown in FIG. 2, is then presented on Plan Position Indicator (PPI) 28, or video screen, for review. After the signal S2 is displayed on the PPI 28, it is reviewed by an operator to identify the presence of the object 24. The operator reviews the signal S2 to identify echos 30, 32, 34, and 36. These echos indicate the size and range of the object 24.

The signal S2 includes other information as well. In particular, when the signal S1 is transmitted from the antenna 22 it is reflected by other items such as the sea or land. The transmitted signal S1 can also be reflected by items in the atmosphere, which are not shown, such as rain and chaff. The reflections caused by these elements produce unwanted echos in the signal S2. These unwanted echos are known as clutter.

The presence of clutter in the signal S2 can make it difficult for an operator reviewing the PPI 28 to distinguish the echos 30–36 associated with the object 24 from the echos associated with the clutter. As a result, the clutter is many times mistakenly identified as an object of interest. This misinterpretation of the data presented on the PPI 28 causes unwanted false alarms.

Conventional radar systems of a similar type have been designed to address this problem and provide, as is known in the art, a radar system with a constant false alarm rate. In particular, FIG. 3 shows a conventional radar system which includes a Cell Averaging (CA) Constant False Alarm Rate (CFAR) device 40. The CA CFAR device 40 eliminates, to a certain extent, the clutter component from the signal S2 and creates a synthetic signal S3 for display on the PPI 28.

Referring to FIG. 4, the conventional CA CFAR device 40 includes a Moving Window Average Calculator (MWAC) 42, a multiplying component 44, and a comparator 46.

The MWAC 42 computes a Moving Window Average (MWA) for each range cell in the signal S2. The MWA represents an arithmetic mean or a geometric mean which is calculated over a local range of cells surrounding each range cell in the signal S2. FIG. 5 shows one example of the many methods in which an MWA can be calculated. Specifically, FIG. 5 shows a method of calculated an MWA for range cell R5 in signal S2 using an arithmetic mean.

Once the MWA is calculated for each range cell, it is then multiplied by a fixed offset factor by multiplying component 44 to create a signal SB. The offset factor can be a factor of any value where the larger the value of the offset factor, the lower the false alarm rate of the radar system.

The value of the signal SB calculated for each range cell is then compared to the actual value S2 for each range cell by a comparator 46. The comparator 46 produces an output only when the value of S2 is greater than the value of SB to create the signal S3.

The signal S3 produced by the CA CFAR device 40, as shown in FIG. 6, is essentially free from the clutter components shown in FIG. 2 and allows the operator to better identify the echos 30–36 produced by the object 24. As a result this technique, the operator can interpret the PPI 28 with a reduced number of false alarms.

Conventional radar systems with CA CFAR devices, such as the ones described above, do however have certain drawbacks. In particular, conventional CA CFAR devices use a fixed offset factor which is based on a Probability Density Function (PDF) used to model the clutter. This PDF in many instances, however, does not accurately model the clutter. As a result, when this is the case, the fixed offset factor based on the PDF is in error and false alarm rates increase dramatically.

FIG. 7 shows a hypothetical PDF used by conventional devices to model clutter. Statistically, the PDF represents the probability of clutter equaling any value X. Referring to FIG. 7, if $\bar{x}$ is offset by a factor K (i.e., 1, 2, 3 or 4), the probability of the clutter exceeding K.$\bar{X}$ is the area under the curve to the right of this value. Therefore, if $\bar{X}$ is offset by a factor of 3 then the probability of the clutter exceeding this value would be 1×10-4. Thus, as can be seen, the larger the factor K( multiplied times $\bar{X}$, the smaller the chance that the resulting value will constitute clutter.

The offset factor used by the multiplying component 44 in conventional devices is selected based on an assumed PDF as described above. That is, if a conventional radar system were designed to provide a synthetic signal S3 having a $1 \times 10^4$ chance of constituting clutter, an offset factor of 3 would be stored in the multiplying component 44.

The approach used by conventional radar systems to calculate an offset factor has certain flaws. In particular, the PDF used by conventional devices to model the statistical occurrence of clutter is a Weibull PDF which assumes a skew factor of 2. This is known in the art as a Rayleigh distribution. In certain instances, however, when the source of clutter is varied and includes a combination of land, sea, rain, and chaff, a Weibull PDF with an assumed skew factor of 2 does not accurately model the clutter. In particular, in these instances, a Weibull PDF with an assumed skew factor of 2 underestimates the area under the curve at extended values of X. As a result, when these conditions are present, the offset factor based on the PDF is underestimated and false alarms are no longer properly controlled.

OBJECTS AND SUMMARY OF THE INVENTION

It is accordingly an object of this invention to estimate a skew factor of a PDF based on information contained in a signal received by a radar system. It is another object of the invention to calculate an offset factor based on the estimated skew factor.

In accordance with one aspect of the invention, a radar system for identifying an object of interest is described, where the radar system comprises: (i) a transmitter means for producing a first signal; (ii) a duplexer means for receiving and processing signals, where the duplexer means receives the first signal from the transmitter; (iii) an antenna, where the antenna receives the first signal from the duplexer means and transmits the first signal into the atmosphere, receives a second signal reflected by objects present in the atmosphere, and routes the second signal to the duplexer; (iv) a receiving means for receiving the second signal from the duplexer, where the receiving means samples the second signal at defined intervals known as range cells, and develops a third signal; (v) a cell averaging (CA) constant false alarm rate (CFAR) means for eliminating a clutter component from the third signal and developing a fourth signal, where the CA CFAR means includes (a) a moving window average calculator (MWAC), (b) a central processing unit (CPU) for estimating a skew factor of a probability density function (PDF) and calculating an offset factor based on information contained in the third signal, (c) a multiplying unit, and (d) a comparator; and (vi) a display means for receiving and displaying the fourth signal.

In accordance with another aspect of the invention a CA CFAR device for eliminating a clutter component from a signal received by a radar system containing a plurality of range cells is defined, where the CA CFAR device comprises: (i) a moving window average calculator (MWAC) for calculating a moving window average for each range cell in the received signal; (ii) a central processing unit (CPU) for estimating skew factor of a probability density function (PDF) and calculating an offset factor based on information contained in the received signal; (iii) a multiplying means for multiplying the offset factor by the MWA calculated for each range cell in the received signal to create a second signal containing a plurality of range cells; and (iv) a comparator for comparing each range cell of the second signal to each corresponding range cell of the received signal and selecting a the larger value of the two signals to create a third signal.

In accordance with yet another aspect of the invention, a method for identifying an object of interest when using a radar system is defined, where the method comprises the steps of: (i) transmitting a first signal into the atmosphere;(ii) receiving a second signal reflected by objects present in the atmosphere; and, (iii) using a CA CFAR normalization technique to estimate a skew factor of a probability density function (PDF) and calculate an offset factor M based on information contained in the second signal.

BRIEF DESCRIPTION OF THE DRAWINGS

The accompanying drawings are included to provide an understanding of the invention and constitute a part of the specification.

FIG. 3 illustrates another conventional radar system;

FIG. 4 illustrates a CA CFAR device used in the conventional radar system shown in FIG. 3;

FIG. 8 illustrates a CA CFAR device in accordance with the present invention;

DETAILED DESCRIPTION OF THE INVENTION

FIG. 8 shows an embodiment of a CA CFAR device 50 in accordance with the present invention. Referring to FIG. 8, the CA CFAR device 50 includes a Moving Window Average Calculator (MWAC) 52, a Central Processing Unit (CPU) 54, a multiplying component 56, and a comparator 58.

Operationally, when a digitized sample of the voltage v for each range cell of the signal S2 is received by the CA CFAR device 50, it is sent to the MWAC 52, CPU 54, and comparator 58. The MWAC 52 calculates a Moving Window Average (MWA) for each range cell of the signal S2 in a manner similar to conventional devices. That is, the MWAC 52 calculates a MWA over a local range of cells for each range cell in the signal S2.

The CPU 54 contained in the CA CFAR device 50, unlike conventional devices, estimates a skew factor of a PDF to model the clutter based on information contained in the signal S2. After estimating the PDF, the CPU 54 then calculates an offset factor to maintain a desired false alarm rate.

Figure 1:
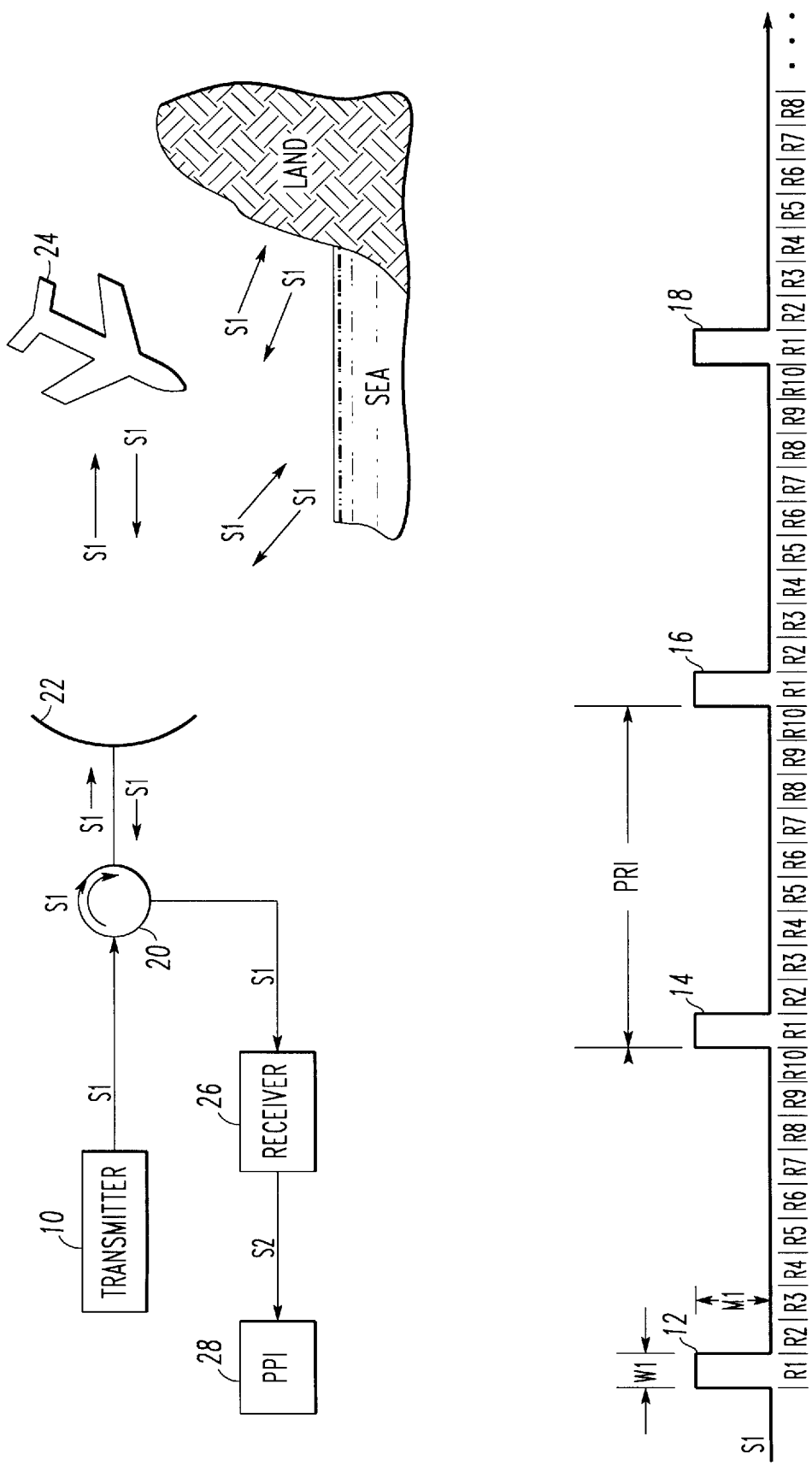
FIG. 1 illustrates a conventional radar system.
Figure 2:
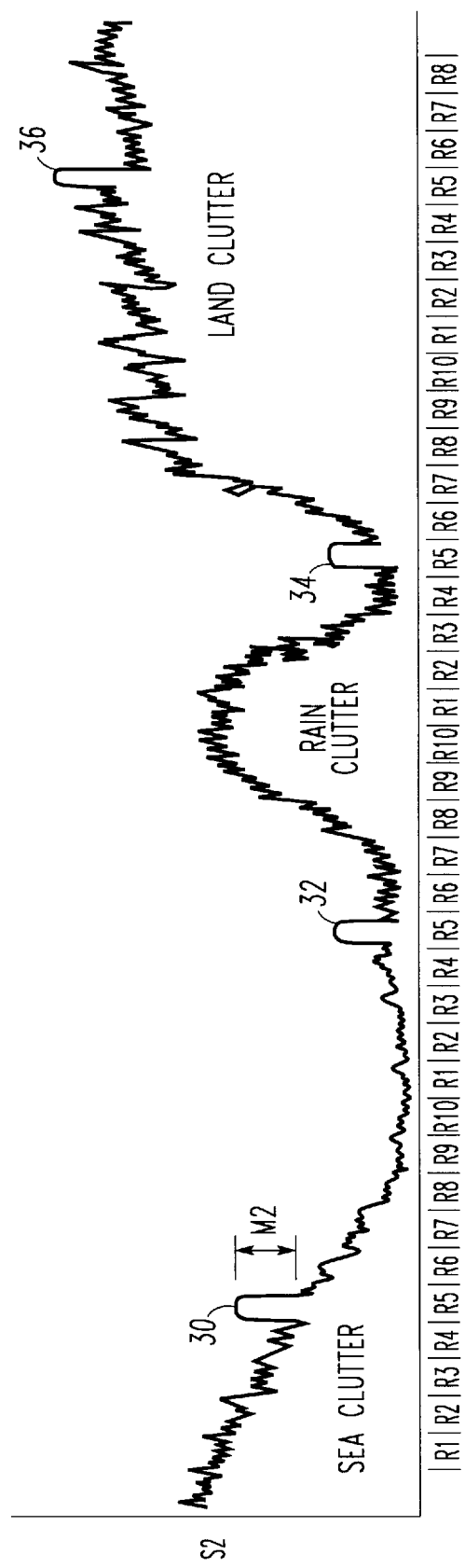
FIG. 2 illustrates a signal S2 produced by the conventional radar system shown in FIG. 1.
Figure 5:
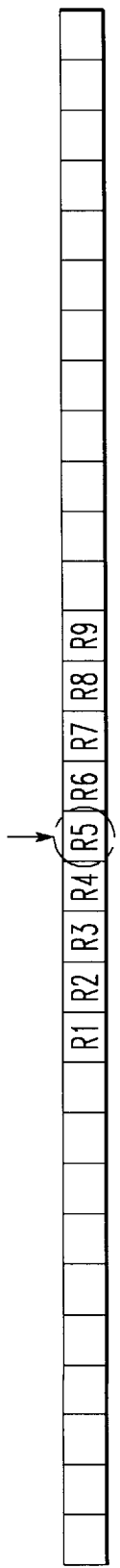
FIG. 5 illustrates a calculation performed by the CA CFAR device shown in FIG. 4.
Figure 6:
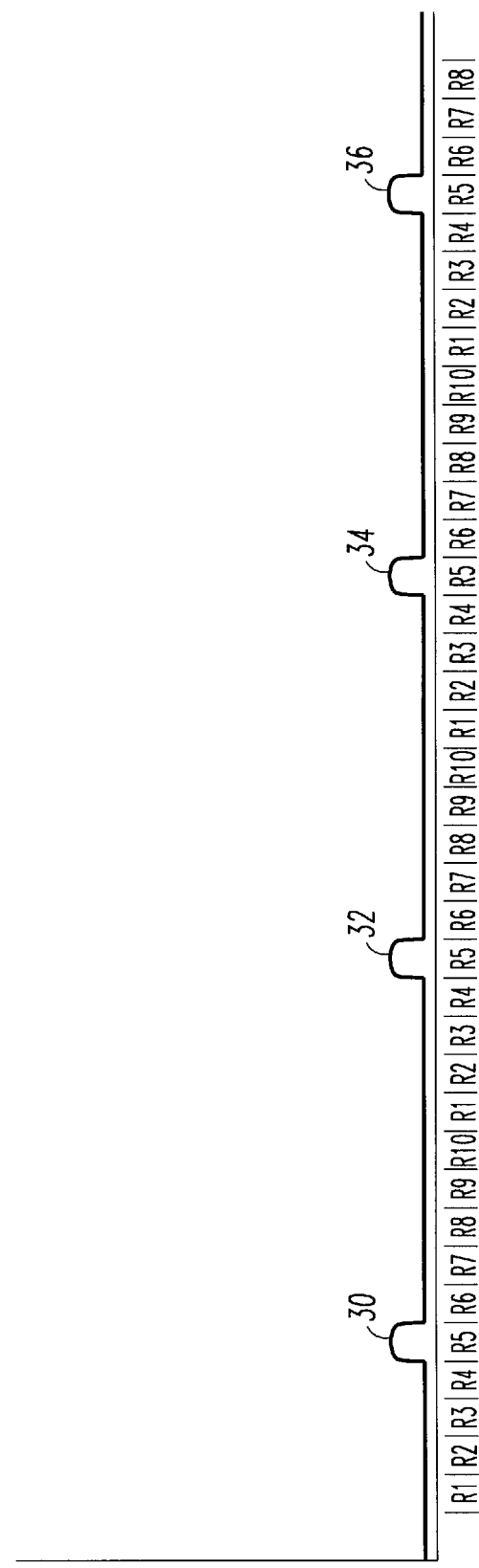
FIG. 6 illustrates a signal S3 produced by the CA CFAR device shown in FIG. 4.
Figure 7:
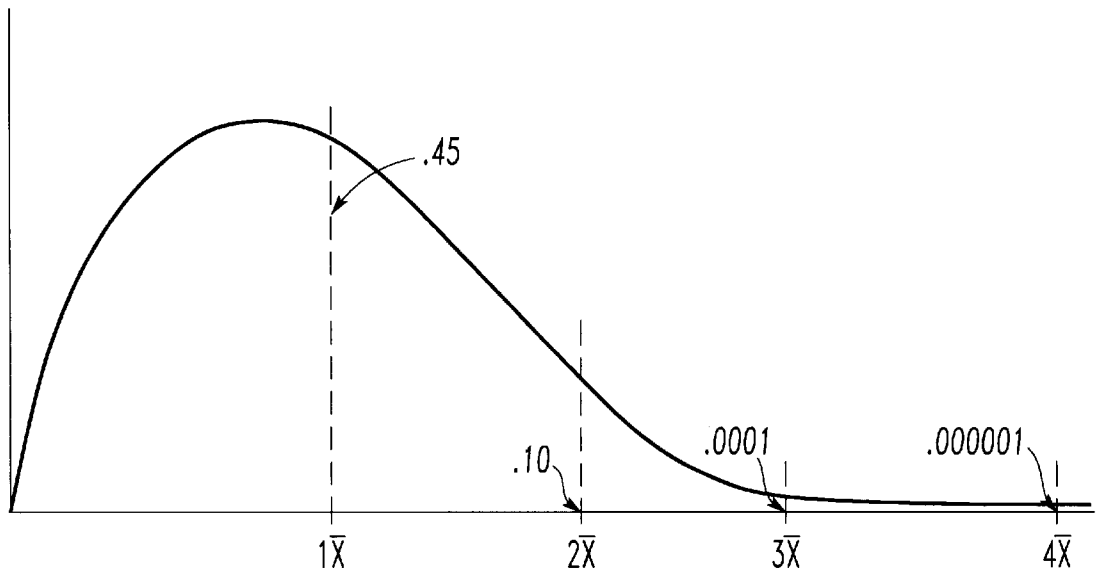
FIG. 7 illustrates a PDF used by the CA CFAR device shown in FIG. 4 to model clutter.
Figure 9:
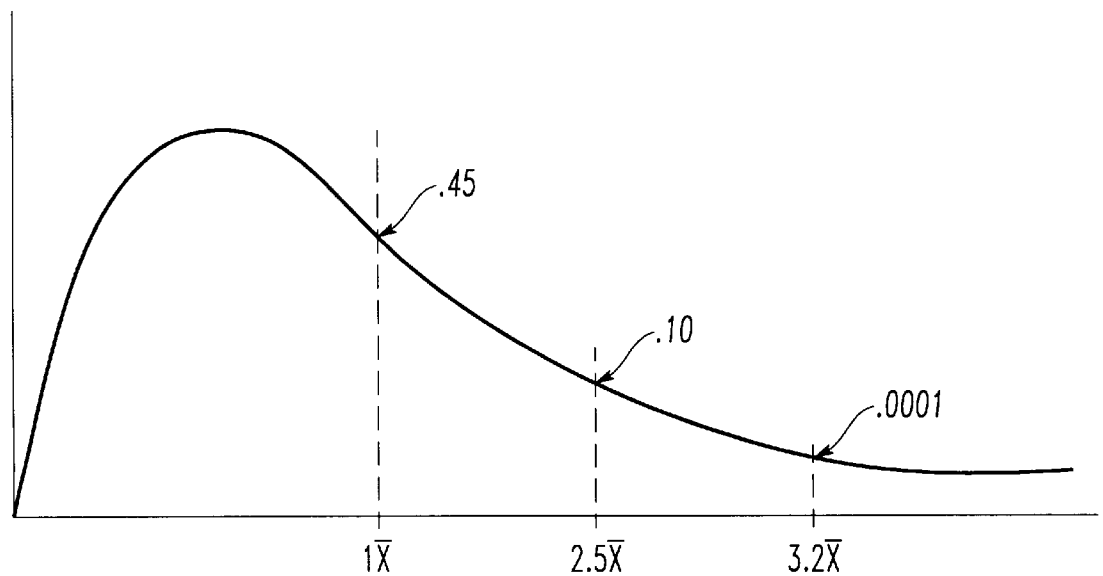
FIG. 9 illustrates a PDF with a skew factor derived by the CA CFAR device shown in FIG. 8 in accordance with the present invention; and, FIG. 10 illustrates a graphical relationship found to exist between a skew factor S and a factor r in accordance with the present invention.

FIG. 9 shows an example of a PDF with a skew factor which was estimated in accordance with the present invention. The CPU 54 estimates the skew factor of the PDF and then calculates an offset factor which is used by the multiplying component 56.

The offset factor is determined based on the false alarm rate required by the design of the radar system and the calculated skew factor. For example, referring to the PDF shown in FIG. 9, if the radar system is desired to have a false alarm rate of .10, then an offset factor of 2.5 is used by the multiplying unit 56. Similarly, if the radar system is desired to have a false alarm rate of $1 \times 10^{-4}$, then an offset factor of 3.2 is used by the multiplying unit 56.

After the offset factor is calculated, referring again to FIG. 8, the multiplying component 56 multiplies the MWA calculated for each range cell by the offset factor to create a signal SB. The value of the signal SB calculated for each range cell is then compared to the actual value S2 for each range cell by the comparator 58. The comparator 58 produces an output only when the value of S2 is greater than the value of SB to create a synthetic signal S3.

The operations performed by the CPU 54, in accordance with the present invention, to estimate the skew factor of the PDF and calculate the offset factor are described below.

Unwanted echos received by the radar system, which are due to noise or clutter, are characterized by a Weibull PDF with an unknown skew factor. The Weibull PDF is mathematically expressed as shown in Equation 1 below.

$$p(v) = \frac{S \cdot V^{S-1} \cdot e^{-(V^S/K^S)}}{K^S} \quad \text{Equation (1)}$$

In Equation 1, K represents a scale factor and S represents a skew factor.

To maintain a constant false alarm probability (FAP), the voltage v represented by the PDF needs to be maintained above the threshold level SB described above. The required value of SB, to maintain the constant FAP, is expressed in Equation 2 below. Equation (2) $SB = M_A \times m_A$, or $SB = M_G \times m_G$ In Equation 2, $m_A$ is the arithmetic mean of v and $m_G$ is the geometric mean of v, where both $m_A$, and $m_G$ are are estimated by the MWAC 52. $M_A$ and $M_G$, as shown in Equation 2, represent the appropriate offset factor and are estimated by the CPU 54. $M_A$ and $M_G$ are solely dependent on the desired FAP and skew factor S. $M_A$ and $M_G$ are expressed as shown in Equation 3 below.

$$M_A = \frac{(-\ln(FAP))^{1/S}}{r(1+1/S)} \text{ or} \qquad \text{Equation (3)}$$

$$M_G = \frac{(-\ln(FAP))^{1/S}}{e^{(-0.5772/S)}}$$

Figure 10:
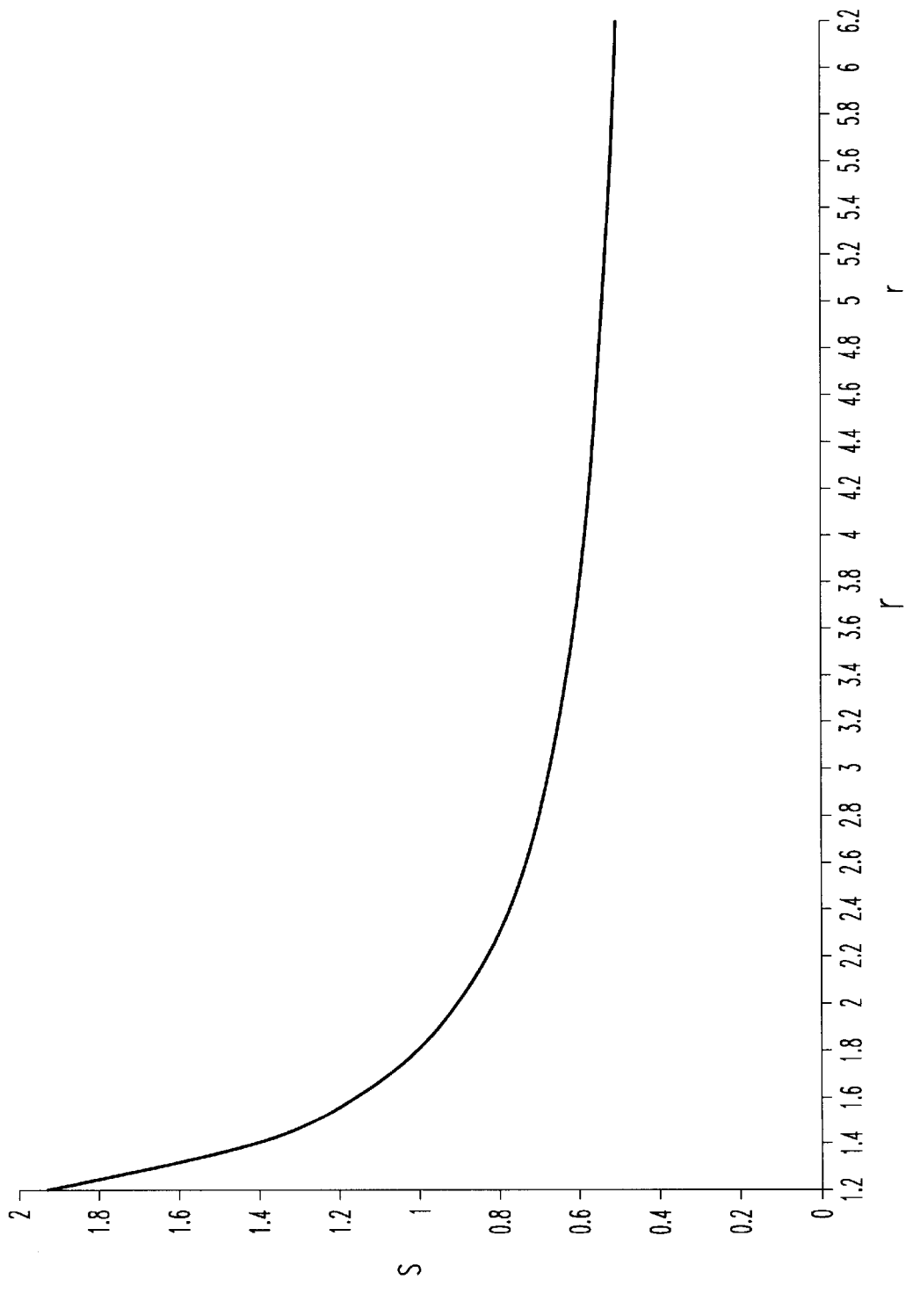

A key aspect of the invention, among others, is that the CPU 54 contained in CA CFAR device 50 estimates the skew factor S of the PDF based on a factor r which is a ratio of the arithmetic mean $m_A$ and the geometric mean $M_G$. This newly identified relationship between the skew factor S and the factor r is shown graphically in FIG. 10 and mathematically in Equation 4 below.

$$S = \frac{0.6084}{(r-0.805)} + 0.39 \qquad \text{Equation (4)}$$

The factor r is shown mathematically in Equation 5 below.

$$r = \frac{\text{arithmetic mean}}{\text{geometric mean}} = \frac{m_A}{m_G} \qquad \text{Equation (5)}$$

Given that the voltage v is known for each range cell in the signal S2, the the CPU 54 can perform a series of calculations using the Equations (3) through (5) to calculate an offset factor $M_A$ or $M_G$. In particular, the CPU 54 (i) calculates the factor r in accordance with Equation 5 based on arithmetic and geometric means $m_A$ and $m_G$ calculated by the MWAC 52, (ii) calculates the skew factor S in accordance with Equation 4, and then (iii) calculates the appropriate offset factor $M_A$ or $M_G$ in accordance with Equation 3.

In an alternative embodiment of the invention, computations (ii) and (iii) can be combined into a single computation where the offset factor $M_A$ and $M_G$ are represented directly as a function of r.

The offset factor $M_A$ or $M_G$ calculated by the CPU 54 is then applied, via the multiplying unit 56, to the arithmetic or geometric mean generated by the MWAC 52. This produces the desired threshold SB in accordance with Equation 2 for input to the comparator 58.

The CA CFAR device described herein differs greatly from conventional CA CFAR devices which do not calculate an offset factor but rather use a fixed value for the offset factor. A CA CFAR device used in accordance with the present invention produces a threshold SB based on a calculated offset factor which adapts to changes in the PDF. This feature better controls the false alarm probability FAB of the radar system.

The present invention is not to be considered limited in scope by the preferred embodiments described in the specification. For example, the present invention can be implemented using analog rather than digital signal processing as described herein. Other advantages and modifications, which will readily occur to those skilled in the art from consideration of the specification and practice of the invention, are intended to be within the scope and spirit of the following claims.

I claim:

1. A radar system for identifying an object of interest, said radar system comprising:

a transmitter means for producing a first signal;

a duplexer means for receiving and processing signals, where said duplexer means receives said first signal from said transmitter;

an antenna, where said antenna receives said first signal from said duplexer means and transmits said first signal into the atmosphere, receives a second signal reflected by objects present in the atmosphere, and routes said second signal to said duplexer;

a receiving means for receiving said second signal from said duplexer, where said receiving means samples said second signal at defined intervals known as range cells, and develops a third signal;

a cell averaging (CA) constant false alarm rate (CFAR) means for eliminating a clutter component from said third signal and developing a fourth signal, where said CA CFAR means includes
 (i) a moving window average calculator (MWAC),
 (ii) a central processing unit (CPU) for estimating a skew factor of a probability density function (PDF) and calculating an offset factor based on information contained in said third signal,
 (iii) a multiplying unit, and
 (vi) a comparator; and a display means for receiving and displaying said fourth signal.

2. A radar system as defined in claim 1, wherein (i) said MWAC calculates a moving window average (MWA) for each range cell in said third signal, (ii) said offset factor is calculated by said CPU for each range cell based on said estimated skew factor, (iii) said multiplying unit multiplies said offset factor by said MWA calculated for each range cell to create a threshold signal for each range cell, (iv) said threshold signal calculated for each range cell is compared to each range cell in said third signal by said comparator, and (v) said comparator selects the large value of the two signals to create said fourth signal.

3. A cell averaging (CA) constant false alarm rate (CFAR) device for eliminating a clutter component from a signal received by a radar system containing a plurality of range cells, said CA CFAR device comprising:

a moving window average calculator (MWAC) for calculating a moving window average for each range cell in said received signal;

a central processing unit (CPU) for estimating a skew factor of a probability density function (PDF) and calculating an offset factor based on information contained in said received signal;

a multiplying means for multiplying said offset factor by said MWA calculated for each range cell in said received signal to create a second signal containing a plurality of range cells; and a comparator for comparing each range cell of said second signal to each corresponding range cell of said received signal and selecting a the larger value of the two signals to create a third signal.

4. A method for identifying an object of interest when using a radar system, said method comprising the steps of:

(1) transmitting a first signal into the atmosphere;

(2) receiving a second signal reflected by objects present in the atmosphere; and, (3) using a cell averaging (CA) constant false alarm rate (CFAR) normalization technique to estimate a skew factor of probability density function (PDF) and calculate an offset factor M based on information contained in said second signal.

5. A method for identifying an object of interest using a radar system as described in claim 4, wherein step (3) further includes the steps of:

(a) calculating an arithmetic and geometric mean;
(b) calculating a factor r based on said arithmetic and geometric mean;
(c) calculating a skew factor S based on said factor r;
(d) defining a desired false alarm probability (FAP); and,
(e) calculating said offset factor M based on said skew factor S and said FAP.

6. A method for identifying an object of interest using a radar system as described in claim 5, wherein:

(i) said factor r is defined as follows $$r = \frac{\text{arithmetic mean}}{\text{geometric mean}}$$

(ii) said skew factor S is defined as follows $$S = \frac{0.6084}{(r \cdot 0.805)} + 0.39; \text{ and}$$

(iii) said offset M factor is defined as follows $$M = \frac{(-\ln(FAP))^{1/S}}{r(1 + 1/S)} .$$

7. A method for identifying an object of interest using a radar system as described in claim 6, further including the step of calculating a threshold voltage by multiplying said offset factor M by said arithmetic mean.

8. A method for identifying an object of interest using a radar system as described in claim 5, wherein:

(i) said factor r is defined as follows $$r = \frac{\text{arithmetic mean}}{\text{geometric mean}}$$

(ii) said skew factor S is defined as follows $$S = \frac{0.6084}{(r \cdot 0.805)} + 0.39; \text{ and}$$

(iii) said offset factor M is defined as follows $$M = \frac{(-\ln(FAP))^{1/S}}{e^{(-0.5772/S)}} .$$

9. A method for identifying an object of interest using a radar system as described in claim 8, further including the step of calculating a threshold voltage by multiplying said offset factor M by said geometric mean.

* * * * *